INVENTORS
Ichiro Yasuhara
Masaaki Nagano
Naotoshi Sato

United States Patent Office 3,418,881
Patented Dec. 31, 1968

3,418,881
GENERATING METHOD OF CUTTING GEARS
AND A DEVICE THEREFOR
Ichiro Yasuhara, Shimotsuga-gun, Masaaki Nagano, Kita-Adachi-gun, and Naotoshi Sato, Hekikai-gun, Japan, assignors to Yutaka Seimitsu Kogyo, Ltd., Yono, Japan
Filed Nov. 18, 1965, Ser. No. 508,444
Claims priority, application Japan, Nov. 27, 1964, 39/66,818; Sept. 30, 1965; 40/59,935, 40/79,852; Oct. 5, 1965, 40/60,965, 40/60,966
4 Claims. (Cl. 90—2)

ABSTRACT OF THE DISCLOSURE

A method and apparatus for gear cutting wherein a cutting tool is rotated into engagement with a gear blank which is fixed to a spindle rotatably mounted on a support table. A master gear is also fixed to the spindle and is in engagement with an arcuate gear which is slidably movable along its pitch circle so that when the support table is revolved, the gear blank is rotated due to the engagement of the master gear with the arcuate gear.

This invention relates to an improvement in the generating method of cutting gears and a device therefor, more particularly a novel generating method of cutting gears suitable for manufacturing such gears as bevel gears, spiral bevel gears, spiral bevel gears having tapered teeth, hypoid gears, helical gears and other similar gears, and a novel gear cutting machine based on said method.

The principal object of the invention is to provide a novel generating method especially suitable for cutting such gears as spiral bevel gears having tapered teeth, wherein the tooth spaces of each gear tooth expand gradually as they extend from that side end of the gear which has a small diameter (to be referred a "small end" hereinafter) to the other side end thereof which has a large diameter (to be referred a "large end" hereinafter) and the spiral angle of each gear tooth surface can be selected at will.

Another object of the invention is to provide a novel generating method for cutting tapered gear teeth which have different tooth spaced intervals at the small end and at the large end of the gear, wherein the gear teeth are cut on both forward and backward strokes of a reciprocative cutting operation by modifying the position where a cutting tool starts cutting the blank to be cut.

Another object of hte invention is to provide a novel method of cutting tooth surfaces of a gear at different spiral angles in each stroke of the reciprocative cutting operation based on the generating method.

The invention is also intended to provide a novel indexing head suitable for a gear cutting machine having a master gear based on the generating method of gear cutting, in which the gear cutting machine is so indexed as to cut different tooth surfaces on the blank to be cut in response to each forward or backward stroke of the master gear's reciprocative rotation.

Still further object of the invention is to provide a practical means to sway the generating device of the aforementioned gear cutting machine during the gear cutting operation thereof.

It should be understood here that the invention will be described hereinafter by taking an embodiment of the invention which consists of a process of generating gears by cutting blanks with a cutting tool, however, also possible is to generate desired gears by grinding based on the principles of the present invention if the cutting tool is substituted with a suitable grinding tool. Therefore, the "cutting" operation in the following descriptions should be understood in a wide sense so as to include both cutting and grinding operations of generating tooth surface.

For a better understanding of the invention, reference is taken to the accompanying drawings illustrating machines for cutting spiral bevel gears, in which.

Figure 3A:
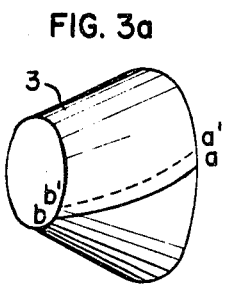
Figure 3B:
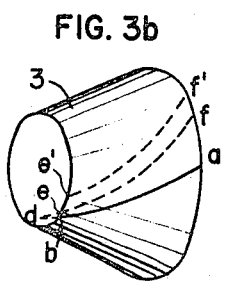
Figure 3C:
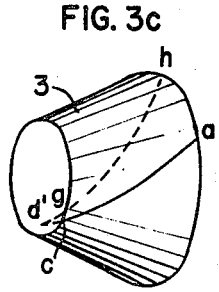
Figure 5A:
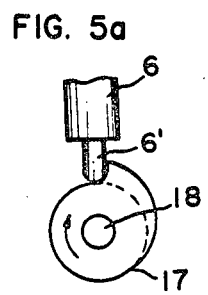
Figure 5B:
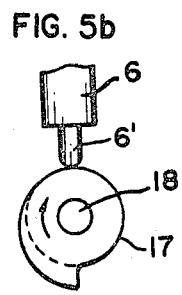
Figure 5C:
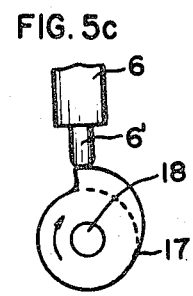
Figure 6A:
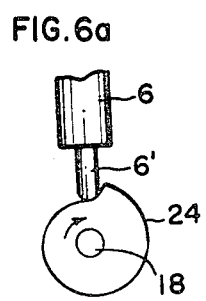
Figure 6B:
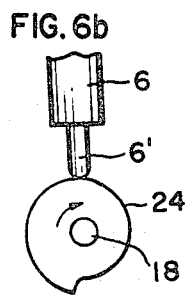
Figure 6C:
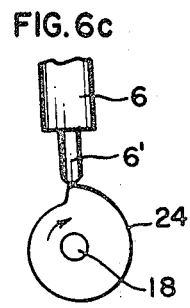
Figure 7:
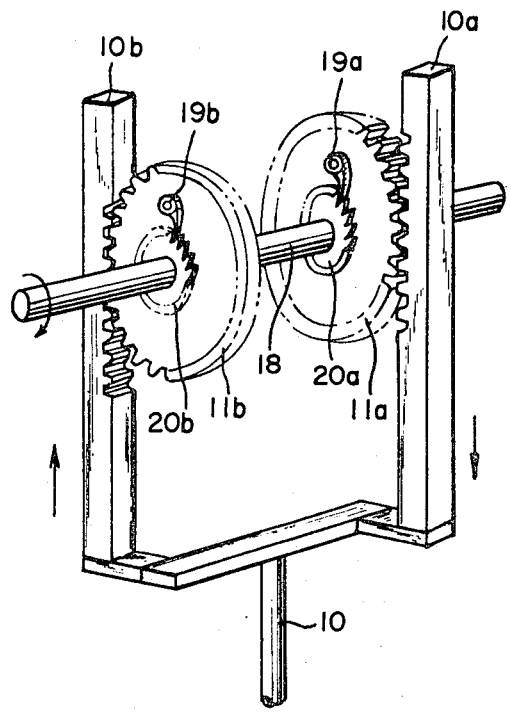
Figure 8:
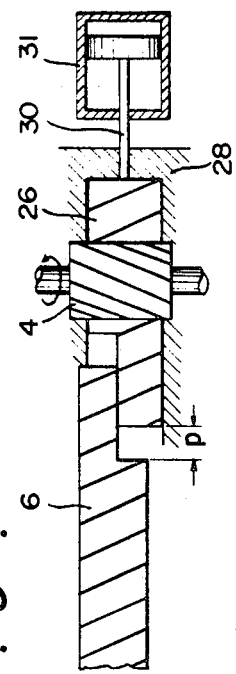
Figure 9:
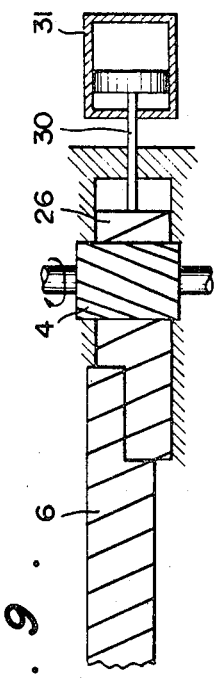
Figure 10:
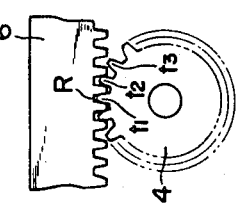

FIGS. 3a, 3b, and 3c are perspective views of blanks to be cut illustrating the tooth traces generated by using cams illustrated in FIGS. 4a, 4b, FIGS. 5a, 5b, 5c, and FIGS. 6a, 6b, 6c respectively;

FIGS. 4a, 4b, 5a, 5b, 5c, 6a, 6b, and 6c illustrate cam constructions suitable for carrying out adjustment of tooth spaced interval of gear and for modifying the position where gear cutting operation starts in the gear cutting machine of the invention;

FIG. 7 is a perspective view of a driving mechanism suitable for driving the cams of FIGS. 4a to 6c;

FIGS. 8 and 9 are developed views of an arcuate shaped gear illustrating the manner in which the blank to be cut is indexed at both ends of each stroke of the cutting operation;

FIG. 10 is diagrammatic illustration of the indexing operation; and

Figure 13:
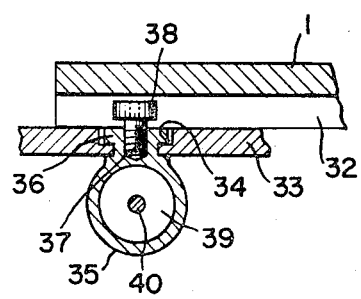
Figure 11:
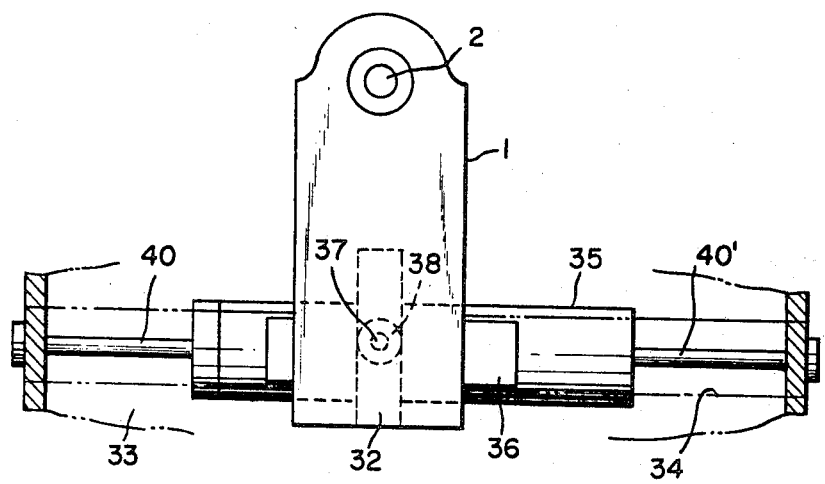
Figure 12:
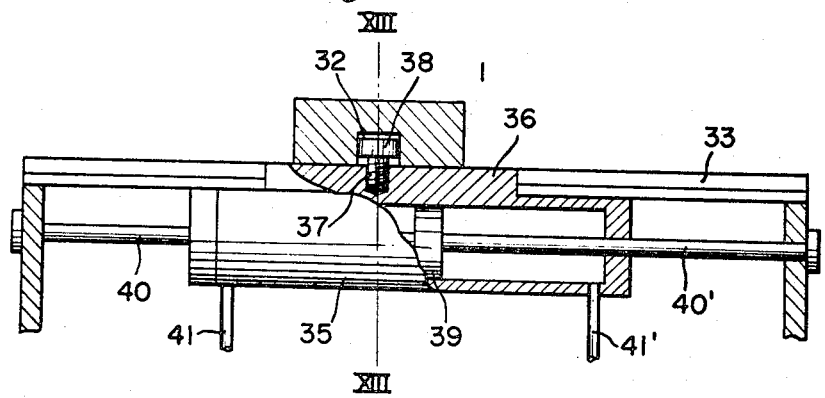

FIGS. 11 to 13 are a plan view, an elevation with a part thereof in section, and a section on the line XIII—XIII of FIG. 12 respectively of a device for swaying a support table to hold the blank to be cut.

Similar reference numerals and symbols refer to similar devices, points and operations respectively throughout the above drawings.

Figure 1:
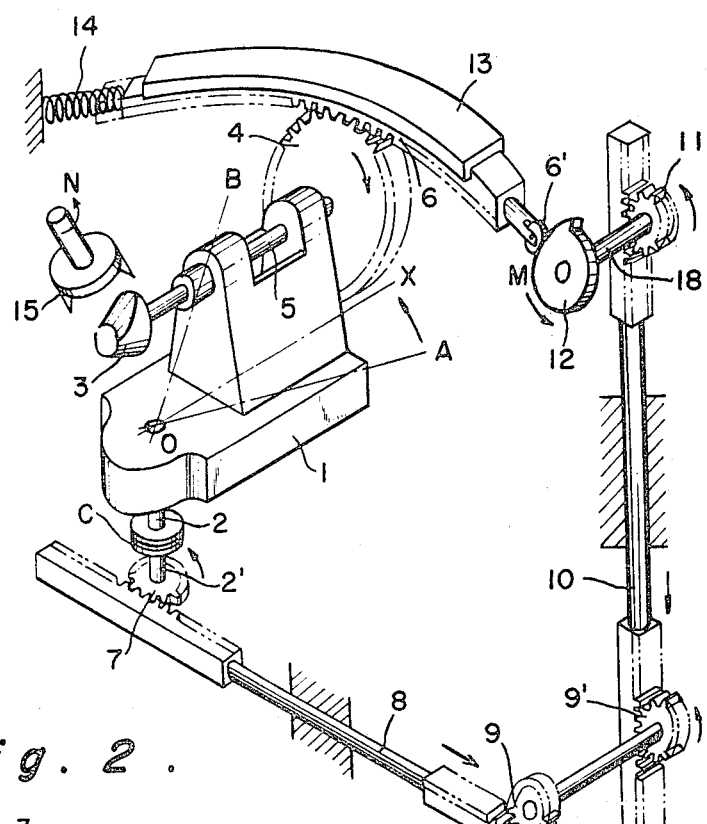
FIG. 1 is a simplified perspective view of a gear cutting machine embodying the invention based on the generating method, wherein the spiral angle of the tooth surfaces to be cut can be adjusted at will.

Referring to FIG. 1, the reference numeral 1 designates a support table journalling a spindle 5 on which a blank 3 to be cut and a master gear 4 are co-axially mounted, 2 a vertical shaft through which the support table 1 is rotatably mounted on a bed (not shown) of the gear cutting machine, 6 an arcuate gear to be engaged with the master gear 4 in a cooperative manner, said arcuate gear 6 represents a part of a crown gear to be engaged with the master gear 4, and 15 a cutting tool to carry out the operation of generating desired tooth surfaces at the proper positions on the surface of the blank 3 to be cut.

If the support table 1 is swayed around the axial centre line of the vertical shaft 2 by a certain predetermined angle while the arcuate gear 6 is held fixed at an angular position, then both the master gear 4 and the blank 3 are rotated around the spindle 5 and at the same time revolved around the shaft 2 as planets around the sun due to the cooperative engagement between the arcuate gear 6 and the master gear 4. One moving direction of each member is indicated by arrow in the figure. Accordingly, the cutting tool 15 acts on the blank 3 to generate such tooth surfaces thereon which are engaged with an imaginary bevel gear comprising gear teeth having tooth surfaces defined by the cutting motion of the cutting edge of the tool 15. Thus, desired tooth surfaces can be generated on the blank 3 by selecting proper rotation and revolution of the blank 3 and cutting motion of the cutting tool 15.

The detailed mechanism for achieving the above gear cutting operation has been known and described for example in U.S. Patent No. 3,137,206 patented on June 16, 1964 and assigned to the assignee of the present invention.

The principal purpose of the invention is to provide a further improvement of the above U.S. patent by shifting the position of the arcuate gear 6 in FIG. 1 while cutting the blank 3 with respect a fixed point, such as the axial centre line of the vertical shaft 2, which results in various advantages in gear cutting operations as will be illustrated hereinafter.

*Modification of spiral angle of each tooth surface to be generated*

In a spiral bevel gear having tapered gear teeth, it is necessary to expand gradually the tooth space of each gear tooth as the tooth extends from the small end towards the large end of the gear. In other words, it is necessary in this case to provide different spiral angles to both surfaces of each tooth. To meet such a need it is preferable to provide such a gear cutting machine which is capable of cutting and generating gear teeth on a blank at any desired spiral angle.

Figure 2:
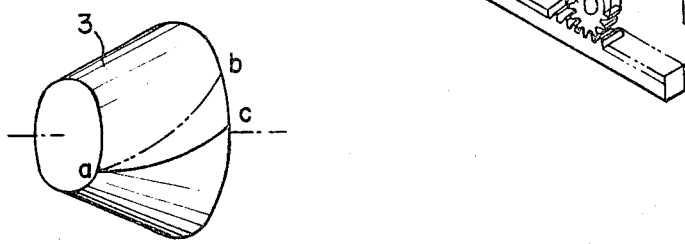
FIG. 2 is a perspective view of a blank to be cut by the machine of FIG. 1 illustrating tooth traces having different spiral angles produced by the method of the invention.

Referring to FIGS. 1 and 2, the support table 1 is secured to the vertical shaft 2 in such a manner that the table can be revolved together with the vertical shaft around the axial centre line of the latter. The support table 1 journals the spindle 5 in a rotatable manner, on which the blank 3 to be cut is mounted at one end thereof and the master gear 4 at the other end thereof both in a coaxial manner with the spindle 5. The master gear 4 is in turn engaged with the arcuate gear 6. In the illustrated embodiment, the rear side of the arcuate gear 6 is slidably inserted and held in an arcuate guide 13. One end of the arcuate gear 6 is provided with a projection 6' and the other end thereof is supported by a fixed wall through a coiled spring 14. The vertical shaft 2 is connected through a clutch C to another shaft 2' on which secured is a gear 7, which is in turn engaged with one end of a rack 8. The other end of the rack 8 is engaged with a gear 9 to drive the gears 9 and 9' mounted on a common shaft in a coaxial manner, thereby a vertical rack rod 10 is moved vertically which is engaged with the gear 9' at the lower end thereof and with another gear 11 at the upper end thereof. The gear 11 and a cam 12 are fixed at opposite ends of a shaft 18, and the projection 6' at one end of the arcuate gear 6 is urged against the cam surface of the cam 12 by the coiled spring 14 while enabling sliding of the projection 6' on the cam surface. In order to facilitate such sliding on the cam surface, a roller can be attached to the tip end of the projection 6', if so desired. The elastic constant of the spring 14 is so selected as to urge the projection 6' against the cam surface with a sufficiently large pressure, whereby the arcuate gear 6 is reciprocated along the arcuate guide member 13 responsive to the rotation of the cam 12. The profile of the cam 12 can be made substantially in any configuration, for instance such as to cause the arcuate gear 6 to move by the distance in direct proportion to the angular displacement of the cam 12.

The operation of the gear cutting machine thus constructed will now be described in detail. For simplicity the operation of the machine of FIG. 1 will be described by taking two cases. In the first case, the clutch C is assumed to be disengaged. With the clutch C disengaged the cam 12 is kept stationary and the arcuate gear 6 is urged against the surface of such a fixed cam by the elastic force of the spring 14, and hence the arcuate gear 6 is in a condition as if it were fixed securely to the arcuate guide member 13 at a certain angular position. If the support table 1 is revolved around the vertical shaft 2 in a reciprocative manner under such conditions, then both the blank 3 to be cut and the master gear 4 are rotated and revolved as an integral body as described in the foregoing. Thereby the blank is cut and gear teeth are generated to produce such a gear which engages with an imaginary gear having gear tooth surfaces of the configuration determined by the cutting movement of the cutting tool. Therefore, during forward stroke in the above movement of the support table 1, wherein the axial centre line OX of the support table is moved from the position OA toward the position OB, a gear tooth surface is cut and generated on the blank 3 at a certain spiral angle for example along the curve a–b in FIG. 2. In the return stroke of the support table movement, wherein said axial centre line OX moves from the position along the line OB to the position OA, the cutting tool moves along the same locus with that in the forward stroke, but in a reverse direction, for instance along the curve b–a in FIG. 2.

The operation of the machine of FIG. 1 when the clutch C is engaged will now be described as the second case. With the clutch C engaged, the vertical shaft 2 is brought into rigid connection with the shaft 2' having the gear 7, and accordingly as the support table 1 is rotated forwardly around the axis 2 from the position OA to the position OB, such angular movement of the support table 1 causes rotation of the cam 12 in a direction as shown by the arrow M in FIG. 1 by means of said gear 7, rack rod 8, gear 9, 9', rack rod 10, and gear 11. Such rotation of the cam 12 causes movement of the arcuate gear 6 in a direction toward the spring 14, whereby a tooth surface having a spiral angle different from that in the first case is generated as illustrated by the curve a–c in FIG. 2. As the support table 1 is rotated backwardly from the position OB to the position OA, the angular position of the cam 12 is also returned, whereby the same tooth surface as that in the forward stroke of the support table rotation will be generated on the blank in a reversed manner as shown by the curve c–a in FIG. 2. The distance b–c in FIG. 2 can be adjusted at will by varying the lift of the cam 12.

As described in the foregoing, according to the gear cutting machine of the invention, gear teeth of any desired spiral angle can be generated and cut by moving the arcuate gear 6 responsive to the revolution of the support table 1 around the vertical shaft, which generates gear tooth surfaces having different spiral angles compared with that produced by holding the arcuate gear 6 at a certain position throughout the generating process. Thus, it is now made possible to obtain any desired spiral angle by applying a cam 12 of suitable configuration to the gear cutting machine of the invention.

*Modification of the position where gear cutting is to be started*

After applying certain modifications, the gear cutting machine of the invention can be also used for generating bevel gears, hypoid gears, helical gears, etc., wherein the gear to be cut is provided with tooth spaces of tapered space interval expanding gradually as they extend from the small end to the large end of the gear. Such gear teeth can be cut by altering the position where the cutting tool begins to cut each gear tooth surface on the blank to be cut.

In order to generate tooth spaces of a uniform space interval by using the gear cutting process as described in the first case with respect to the machine of FIG. 1, it is sufficient to shift the arcuate gear 6 by a short distance along the arcuate guide 13 at the end of each forward or backward stroke in the revolution of the support table 1 around the vertical axis 2. For instance, a gear tooth space is generated along the curve a–b of FIG. 2 by revolving the support table 1 around the vertical axis 2 from the position OA to the position OB while keeping the arcuate gear 6 at the position as illustrated by solid lines in FIG. 1 throughout the revolution. Then, when the support table 1 is located at the position OB, the position of the arcuate gear 6 is shifted along the arcuate guide 13 by the distance x and fixed at a new position as illustrated by chain lines in FIG. 1. Thereafter the support table 1 is rotated again to return to the position OA, and upon arrival at the position OA, the arcuate gear 6 is moved once again along the arcuate guide 13 by the distance x in the opposite direction as at the position OB, and fixed at thus returned position. The tooth surface produced by such backward stroke of the support table is, for example, along the curve $b'-a'$ in FIG. 3a, which is different from the similar curve $a-b$ generated during the forward stroke thereof. Thus, tooth spaces of any desired interval can be generated on the blank by regulating the distance $x$ for shifting the arcuate gear 6 at the end of each forward or backward stroke of the support table revolution around the vertical shaft 2.

Figure 4A:
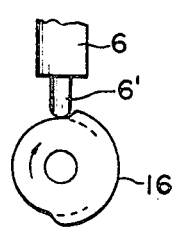
Figure 4B:
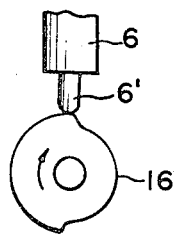

FIGS. 4a and 4b illustrate an example of suitable cam surface configurations for generating such gear tooth spaces of desired interval. It is assumed in the cam of FIGS. 4a and 4b that the cam is rotated in one direction only as illustrated by the solid line arrow therein and the cam 16 is to make a complete rotation around its own centre as the support table 1 makes a complete reciprocative angular movement OA–OB–OA around the vertical shaft 2 by means of a suitable gearing means between the two. The cam 16 comprises a semi-circular portion having a small radius and another semi-circular portion having a large radius, wherein said two semi-circular portions are disposed at diametrically opposite sides of the cam in a concentric manner by connecting the two portions with smoothly curved continuous surfaces. The cam 16 is mounted on the gear cutting machine in such a manner that when the support table 1 is at the position OA, the projection 6' attached to one end of the arcuate gear 6 makes contact with the cam 16 at one end of the small semi-circular portion thereof in an abutting relation with the connecting curved surface between the large and the small semi-circular surfaces, as shown in FIG. 4a. The arcuate gear 6 is not moved at all while the support table travels from the position OA to the position OB, however, upon arrival of the support table 1 at the position OB, the projection 6' is forced to move from one end of the small semi-circular portion to adjacent end of the large semi-circular portion of the cam as shown in FIG 4b, whereby the arcuate gear 6 is shifted by the distance $x$. The arcuate gear 6 is kept stationary during the backward stroke of the support table 1 too, and upon arrival of the support table 1 at the position OA, the projection 6' and accordingly the arcuate gear 6 return to their original positions as illustrated in FIG. 4a.

According to the principles of the invention it is also possible to generate tapered teeth having an interval expanding gradually as the teeth extend from the small end to the large end of the gear. Referring to FIGS. 4a to 5c, instead of using a cam 16 having a profile consisting of a large and a small semi-circular portions, if a cam 17 having a profile consisting of a lift varying in direct proportion to the angular displacement of the support table 1 around the vertical shaft 2 at one half or entire surface thereof is used, and furthermore if the cam 17 is so related to the support table 1 that the former makes a complete one rotation around its own centre while the latter makes a complete reciprocative movement OA–OB–OA around the vertical shaft 2, then the spiral angle of the tooth surface generated during the forward stroke of the support table will be different from that generated during the return stroke thereof, whereby a desired tapered tooth can be produced.

FIGS. 5a to 5c illustrate an example of such cam suitable for generating tapered gear teeth, wherein the profile of the cam 17 consists of a semi-circular portion to represent one half of the cam and a portion having a lift increasing gradually in direct proportion to the angular displacement of the support table 1 as described in the foregoing to represent the remaining half of the cam. If it is assumed that the projection 6' is located at the beginning of said semi-circular portion of the cam 17 as illustrated in FIG. 5a when the support table 1 is located at the position OA, then the arcuate gear 6 will not move at all while the support table 1 completes a forward stroke from the position OA to the position OB and the cam 17 comes to a position as shown in FIG. 5b, and a tooth surface is generated on the blank 3 as shown by the curve $a-b$ in FIG. 3b.

In general, when the support table 1 arrives at the position OB and the projection 6' comes at a border position between the semi-circular portion and the gradually lifted portion of the cam 17, as illustrated in FIG. 5b, then the locus of the engaging point between the cutting edge of the cutting tool 15 and the surface of the blank 3 is extended beyond the end surface of the blank 3 and such locus reaches at a point such as the point $d$ in FIG. 3b, which is outside of the surface of the blank 3. Thereafter as the support table 1 makes the return stroke from the position OB to the position OA, the arcuate gear 6 is moved gradually towards the spring 14 due to the fact that the projection 6' is urged against that portion of the cam where the lift changes gradually, and the cam 17 comes to a position as shown by FIG. 5c just prior to the arrival of the support table 1 at the positon OA, whereby a tooth surface as shown by the curve $e-f$ in FIG. 3b is produced on the blank 3. Thereafter, as the cam 17 makes final part of its rotation from the position as shown by FIG. 5c to the position as shown by FIG. 5a, the projection 6' and accordingly the arcuate gear 6 is shifted rightward by a distance $x$, whereby that position on the surface of the blank 3 where the rotary cutting tool 15 is to begin its cutting operation is brought to the point $a$ as shown in FIG. 3b. The machine is now ready for indexing for the next following generating operation.

In the generating process using a cam as illustrated in FIGS. 5a to 5c, if the cam 17 is mounted on the gear cutting machine with an angular displacement of 180 degrees compared with the position as shown in FIGS. 5a to 5c, then the tooth surface $e-f$ is generated at first while the support table 1 makes its forward stroke around the vertical shaft 2, and then the arcuate gear 6 is shifted rightward by the distance $x$ corresponding to the angular displacement $f-a$ of the blank 3 when the support table 1 travels in the proximity of the position OB, thereafter the tooth surface $a-b$ is generated while the support table 1 completes its return stroke.

In the cam profile as shown in FIGS. 5a to 5c, there is only one rapidly changing stepped portion at the border portion between one end of the semi-circular portion and the highest end of the remaining portion of the profile, however, it is also permissible to provide two such stepped portions in the profile, i.e., at both ends of the semi-circular portion, either by reducing the radius of the curvature of the semi-circular portion or by modifying the cam lift at the border points between the semi-circular portion and the remaining portion of the cam, then it is possible to generate such tooth surfaces as shown by the curves $a-b$ and $e''f'$ in FIG. 3b.

Thus, according to the gear cutting machine of the invention, the positions on the blank surface where the cutting operation of the cutting tool begins can be modified at will both in forward and backward strokes by displacing the arcuate gear 6 at one or both ends of the reciprocative revolving movement of the support table 1.

It is also made possible in the device of the invention to generate tapered gear teeth of a bevel gear having different space intervals at the large end and at the small end of the gear, as will be described hereinafter.

The mechanism for carrying out the above displacement of the arcuate gear 6 in direct proportion to the displacement of the support table stroke by rotating the cam 17 in a suitable relation to the reciprocative movement of the support table 1 will be also described in detail hereinafter.

*Generation of independent spiral angle in each of forward and return strokes of gear cutting process*

In generating a spiral bevel gear having tapered gear teeth, it is necessary to expand the space interval of each gear tooth gradually as the gear tooth extend from the small end to the large end of the bevel gear. In other words, the spiral angles of the gear surfaces generated on both sides of a gear tooth should be different from each other. According to the device of the invention gear tooth surfaces of different spiral angles can be generated both in forward and backward strokes of the gear generating process.

An example of the methods for producing such tapered gear teeth has been described in the foregoing with regard to the application of the cam 17 as shown in FIG. 5. It should be noted that the cam 17 must be rotated in only one direction at a rate of one complete rotation per one complete reciprocative movement of the support table 1 comprising a forward and a backward stroke around the vertical shaft 2. In other words there is a need for a converting device T to convert the vertical reciprocative motion of the rack bar 10 into a unidirectional rotation of the cam 17.

FIG. 7 illustrates an embodiment of such converting device T, wherein the cam shaft 18 is adapted to make one complete rotation around its own longitudinal axial centre line responsive to one complete vertical reciprocative movement of the rack rod 10 as illustrated in FIGS. 1 and 7, and accordingly responsive to one complete reciprocative revolution of the support table 1 comprising a forward stroke and a backward stroke around the vertical shaft 2. If a cam, such as one of those shown in FIGS. 4, 5 and 6, is secured on the cam shaft 18 as illustrated in FIG. 1 in a concentric manner, then such cam is to make one complete rotation around its centre responsive to one complete reciprocative revolution of the support table 1 around the vertical shaft 2.

Referring to FIG. 7, as the rack bar 10 is reciprocated vertically, small rack rods 10a and 10b connected to said rack 10 rigidly through a suitable connecting means are also reciprocated vertically. When the small rack rod 10a is moved downward, a gear 11a axially mounted on the shaft 18 in a rotatable manner is rotated in a clockwise direction due to its engagement with the small rack 10a and a claw 19a secured on one side of the gear 11a is brought into an operative engagement with a ratchet wheel 20a coaxially affixed on the cam shaft 18, thereby the cam shaft 18 is rotated in a clockwise direction, whilst the other small rack 10b makes idling movement due to inoperative engagement between a claw 19b and a ratchet wheel 20b corresponding to the claw 19a and ratchet wheel 20a respectively.

On the other hand, when the main rack rod 10 is moved upward, another gear 11b axially mounted on the cam shaft 18 in a rotatable manner is rotated in a clockwise direction due to its engagement with the small rack rod 10b and the claw 19b secured on one side of the gear 11b is brought into operative engagement with the ratchet wheel 20b coaxially affixed to said shaft 18, thereby the shaft 18 is again rotated in a clockwise direction, while the small rack rod 10a makes an idling movement due to inoperative engagement between the claw 19a and the ratchet wheel 20a. Thus, the cam shaft 18 is rotated in a clockwise direction for either of the upward and downward movements of the rack rod 10, and furthermore, by providing suitable gear ratios in the gearing system between the vertical shaft 2 and the horizontal cam shaft 18, it is possible to establish a correspondence between one complete rotation of the cam shaft 18 and one complete reciprocative revolution of the support table 1 around the vertical shaft 2.

FIG. 6 illustrates a cam 24, which also suits for generating gear surfaces at different spiral angles during both forward and backward strokes of the support table 1. The cam 24 can be mounted on the shaft 18 in the same manner as the cam 17 shown in FIG. 5. The profile of the cam 24 is characterized in that its lift is increased continuously throughout its entire periphery in direct proportion to the angular displacement of the shaft 18 except for connecting curved portion for connecting the end point of the cam surface to the starting point thereof in order to keep the arcuate gear 6 at a certain predeterminer angular position whenever the support table 1 is brought to the starting position of the reciprocative revolution, for instance the position OA. Angular positions of the cam 24 in FIGS. 6a, 6b, and 6c corresponds to angular positions of the support table 1 at OA, OB, and just prior to OA, respectively.

It is apparent from the preceding descriptions on the function of the cam 17 that if the cam 17 is replaced with the cam 24 having a cam profile as shown in FIG. 6, then the gear tooth surface generated during the forward stroke of the support table 1, such as the curve a–c in FIG. 3c, will have a different spiral angle from that generated by the cam 17, such as the curve a–b in FIG. 3b.

During the backward stroke of the support table 1 with the cam 24, it will be easily understood that a gear tooth surface as shown by the curve g–h in FIG. 3c can be generated in the similar manner to that in the return stroke with cam 17.

As described in the foregoing, according to the device of the invention, gear tooth surfaces of different spiral angles at both sides of a tooth space can be generated simply by reciprocating the support table 1 around the vertical shaft 2, and there is no need for any additional preparations or additional operations in order to generate such gear tooth surfaces.

*Indexing the gear cutting operations*

An indexing head for carrying out generation of different tooth surfaces in each of the forward and backward rotation of the master gear around its axis in conjunction with corresponding revolution of the same around the vertical shaft will be described hereinafter.

Referring to FIG. 1, the master gear 4 mounted coaxially on a common spindle 5 with the blank 3 to be cut is provided with the same or multiple number of gear teeth compared with the number of teeth to be generated on the blank, and the generating motion of the gear cutting machine is produced and indexed by using the master gear.

Referring to FIGS. 8 to 9 illustrating developed views of an example of indexing heads suitable for the gear cutting machine of the invention, slidable gear 26 is mounted at one end of the arcuate gear 6 in a slidable manner with respect to the arcuate gear 6. The slidable gear 26 is so mounted that it can be shifted by one pitch of the master gear in the case of those shown in FIGS. 8 and 9, however it can be shifted by multiples of one pitch thereof depending on the required magnitude of indexing. The movement of slidable gear 26 is guided by guide means 28 by placing the former in the latter in such a manner that one end of slidable gear 26 is connected to one end of the arcuate gear 6 with gear teeth thereof brought into continuous relations between each other while the other end of the slidable gear is extended further than the end of the arcuate gear 6.

The slidable gear 26 is connected to a hydraulic device 31 through a rod 30, and a gap $p$ is normally kept between the right side end of the arcuate gear 6 and the gear 26 as shown in FIG. 8. If the hydraulic device 31 is actuated when the master gear 4 is rolled onto the slidable gear 26 after passing through the arcuate gear 6, then the slidable gear 26 is moved leftward and brought into the position as shown in FIG. 9.

The master gear 4 returns leftward after the slidable gear 26 is moved leftward as described above. After the master gear 4 is moved on the arcuate gear 6, the slidable gear 26 is pulled back rightward by the hydraulic device 31 to the position as shown in FIG. 8 once again. The timing of actuating the hydraulic device 31 is so related with the revolution of the suppport table 1 around the vertical shaft 2 that the slidable gear 26 is moved as described above.

Referring to FIG. 10, it is now assumed that a gear tooth $t_1$ of the master gear 4 is operatively engaged with a gear tooth space R of the arcuate gear 6 at a certain moment.

When the master gear 4 is rolled rightward and moved onto the slidable gear 26, there appears a force to push the slidable gear 26 leftward due to such rotation of the master gear, however the hydraulic device 31 acts to hold the slidable gear 26 at the position as shown in FIG. 8 by overcoming the above force due to the master gear rotation. As the direction of rotation of the master gear 4 is reversed, the hydraulic device 31 is actuated and moves the slidable gear 26 to the position as shown in FIG. 9, and accordingly, the gear tooth of the master gear 4 is shifted by one pitch when it returns onto the arcuate gear 6. Thus, a gear tooth $t_3$ of the master gear 4 will be engaged with the gear tooth space R of the arcuate gear 6, and the indexing operation of the gear cutting machine is completed.

The indexing head of the invention has been described in the foregoing by taking an example of applying it to a gear cutting machine to generate spiral bevel gears while taking a part of a large bevel gear as the arcuate gear 6, however, helical gears can be also generated by using the indexing head of the invention if a part of the crown gear thereof is used as the arcuate gear 6. It is apparent that if the arcuate gear 6 and the slidable gear 26 is replaced with racks, then the indexing head can be also used for indexing spur gears.

*Driving rotation and revolution of the support table of the gear cutting machine*

The driving mechanism for both rotating the blank to be cut around the axial centre line thereof and revolving the same around the vertical shaft 2 will be described hereinafter.

Referring to FIGS. 11, 12, and 13, illustrating a plan view, a front elevation, and a side elevation of an embodiment of the driving mechanism of the support table 1 according to the present invention, there is provided a groove 32 extending in the radial direction of the support table 1 on the bottom surface thereof, and a long groove 34 is formed on the upper surface of a horizontal bed 33 of the support table, and the direction of the long groove 34 is to intersect with the direction of the above groove 32 when the support table 1 is at the central point of its reciprocative movement.

Fitted in the long groove 34 is a key member 36 secured to the outside wall of the cylinder 35, and with thus fitted key member 36, the cylinder 35 is movable along the long groove 34. A pin 37 is planted at the central portion of the key member 36, and a roller 38 is fitted onto the pin 37 in a rotatable manner. The roller 38 is also fitted in the groove 32 formed on the bottom surface of the support table 1. Therefore, as the cylinder 35 is slided and reciprocated along the long groove 34, the support table 1 is revolved around the vertical shaft 2 while allowing the roller 38 to rotate and slide in the groove 32.

A piston 39 is placed in the cylinder 35, and piston rods 40, 40' extend from the piston 39 through the covers at both ends of the cylinder in an air tight and slidable manner to the side walls of the bed 33 at both side ends thereof and end portions of the piston rods are secured to the wall. Oil pipes 41, 41' extend from end portions of two chambers formed in the cylinder 35 by the piston 39.

Thus, if pressure oil is fed to either of the oil pipes 41, 41' in turn and exhausted through the other of the two pipes in turn, then the cylinder 35 is reciprocated and accordingly the support table 1 is also reciprocated.

According to the driving mechanism of the support table 1 of the invention, the amplitude and the velocity of the reciprocative revolution of the support table 1 can be controlled with ease and at will by regulating the rate of feeding the pressure oil to the cylinder 35.

In addition, the driving mechanism of the invention suits well to a quick return motion of the support table 1 whenever the return stroke of the support table 1 is not used for gear cutting, and the ratio of the forward stroke speed for gear cutting operation and the backward stroke speed for idling can be taken quite high, such as 1:10.

Conventional method for quick return motion comprised either securing the support table 1 to the shaft 2 in order to rotate the shaft and the support table 1 at a high speed by using a D.C. motor or driving the vertical shaft 2 through a worm gear device. Such conventional mechanisms were of complicated construction and expensive to manufacture, and in addition it was difficult to obtain a high ratio of forward and backward speeds in the order of 1:10.

On the other hand, with the driving device of the invention, the velocity of the support table 1 can be changed easily and freely by regulating the pressure oil circuitry by electrical means. Thus, the invention contributes greatly to the industries.

What we claim is:

1. A method of gear cutting comprising the steps of rotatably mounting a spindle having a gear blank and a master gear fixed thereto on a support table, imparting reciprocating movement to said support table about an axis perpendicular to said spindle, bringing said master gear into operative engagement with an arcuate gear in order to cause reciprocative rotation of said gear blank in response to said movement of said table, applying a cutting tool to said blank to generate gear tooth surfaces on said blank defined by a combination of the cutting motion of said cutting tool, the rotation of the blank, and the movement of the table, and transmitting one complete reciprocation of said support table into unidirectional sliding movement of said arcuate gear along its pitch circle to modify the spiral angle of the gear tooth surfaces generated.

2. A gear cutting machine comprising a support table, a spindle rotatably mounted on said support table, a master gear and a gear blank fixed on said spindle, an arcuate gear operatively engaging said master gear, means to reciprocally revolve said table about an axis perpendicular to said spindle to effect simultaneous rotation of said spindle and said gear blank, a cutting tool adapted to engage said gear blank, and transmission means to transmit one complete reciprocation of said support table into unidirectional sliding movement of said arcuate gear along its pitch circle to modify the spiral angle of the gear tooth surfaces generated.

3. A gear cutting machine according to claim 2, wherein said transmission means comprises a cam, a cam follower engaging said cam and one end of said arcuate gear, and means operatively connecting said cam and said support table for connecting said one complete reciprocation of said support table into a complete rotation of said cam.

4. A gear cutting machine according to claim 2, further comprising clutch means adapted to selectively operatively connect said transmission means and said support table.

References Cited

UNITED STATES PATENTS

| 1,324,475 | 12/1919 | Stewart | 90—6 |
| 1,341,953 | 6/1920 | Walter | 90—6 |
| 1,373,957 | 4/1921 | Farnum | 90—5 |
| 1,656,506 | 1/1928 | Williams | 90—5 |

FOREIGN PATENTS 908,880  10/1945  France.

LEONIDAS VLACHOS, *Primary Examiner.*

U.S. Cl. X.R.

90—5, 6